United States Patent
Grinshpun et al.

(10) Patent No.: US 9,826,422 B2
(45) Date of Patent: Nov. 21, 2017

(54) SYSTEM AND METHOD FOR CONTROLLING AN OPERATION OF AN APPLICATION

(71) Applicants: Edward Grinshpun, Freehold, NJ (US); David Faucher, Guthrie Ctr, IA (US); Zulfiquar Sayeed, Highstown, NJ (US); Marty Reiman, Maplewood, NJ (US)

(72) Inventors: Edward Grinshpun, Freehold, NJ (US); David Faucher, Guthrie Ctr, IA (US); Zulfiquar Sayeed, Highstown, NJ (US); Marty Reiman, Maplewood, NJ (US)

(73) Assignee: Alcatel-Lucent USA Inc., Murray Hill, NJ (US)

(*) Notice: Subject to any disclaimer, the term of this patent is extended or adjusted under 35 U.S.C. 154(b) by 175 days.

(21) Appl. No.: 14/724,352

(22) Filed: May 28, 2015

(65) Prior Publication Data

US 2016/0353427 A1  Dec. 1, 2016

(51) Int. Cl.
*H04W 24/04* (2009.01)
*H04W 16/00* (2009.01)
*H04W 72/04* (2009.01)
*H04W 24/08* (2009.01)

(52) U.S. Cl.
CPC ............ *H04W 24/04* (2013.01); *H04W 16/00* (2013.01); *H04W 24/08* (2013.01); *H04W 72/04* (2013.01)

(58) Field of Classification Search
CPC ....... H04W 4/02; H04W 24/00; H04W 24/04; H04W 72/00; H04W 72/082; H04W 24/08; H04W 72/048; H04W 4/22; H04W 4/00

USPC .................................................. 370/329, 336
See application file for complete search history.

(56) References Cited

U.S. PATENT DOCUMENTS

| | | | |
|---|---|---|---|
| 2009/0110087 A1 | 4/2009 | Liu et al. | |
| 2010/0056163 A1* | 3/2010 | Schmidt | H04W 16/18 455/446 |
| 2010/0103862 A1 | 4/2010 | Ulupinar et al. | |
| 2010/0234031 A1* | 9/2010 | Lidron | H04W 16/18 455/446 |

(Continued)

OTHER PUBLICATIONS

"3rd Generation Partnership Project; Technical Specification Group Services and System Aspects; Study on System Enhancements for User Plane Congestion Management (Release 13)," 3GPP TR 23.705, Section 6.1.5.2, pp. 24-30.

(Continued)

*Primary Examiner* — Habte Mered
*Assistant Examiner* — Rownak Islam
(74) *Attorney, Agent, or Firm* — Harness, Dickey & Pierce, P.L.C.

(57) ABSTRACT

The controlling of an operation of an application is implemented in a communication network by obtaining network identification and cell load information for a bearer in order to compute an actual transport block size per physical resource block (ATpP) slope for the bearer. A user equipment (UE) location corresponding to the bearer is associated with geographic pixel information in order to calculate an interference vector. The interference vector is used to compute a coverage map tuple that is used to control the operation of the application. Throughput can also be predicted using the coverage map tuple.

12 Claims, 16 Drawing Sheets

(56) References Cited

U.S. PATENT DOCUMENTS

| | | |
|---|---|---|
| 2010/0290394 A1* | 11/2010 | Noldus .............. H04L 65/1069 370/328 |
| 2011/0039562 A1 | 2/2011 | Balasubramanian et al. |
| 2012/0203909 A1 | 8/2012 | Kavanaugh et al. |
| 2012/0315935 A1* | 12/2012 | Wang Helmersson ........................... H04W 16/18 455/501 |
| 2013/0012157 A1 | 1/2013 | Zhu |
| 2014/0233439 A1 | 8/2014 | Hong et al. |
| 2014/0357300 A1* | 12/2014 | Hao ....................... H04W 4/02 455/456.2 |
| 2014/0369206 A1 | 12/2014 | Karlsson et al. |
| 2015/0195746 A1 | 7/2015 | Franklin et al. |
| 2015/0278245 A1 | 10/2015 | Sagar et al. |
| 2015/0365829 A1* | 12/2015 | Grayson .............. H04W 16/14 455/454 |
| 2016/0227385 A1* | 8/2016 | Ahmad .............. H04L 65/4061 |

OTHER PUBLICATIONS

"3rd Generation Partnership Project; Technical Specification Group Services and System Aspects; Policy and Charging Control Architecture (Release 13)," 3GPP TS 23.203.

"3rd Generation Partnership Project; Technical Specification Group Radio Access Network; Evolved Universal Terrestrial Radio Access (E-UTRA); Physical Layer Procedures (Rlease 12)," 3GPP TS 36.213, Tables 7.1.7.1-1 and 7.1.7.2.1-1, pp. 46-52.

* cited by examiner

FIG. 1
(CONVENTIONAL)
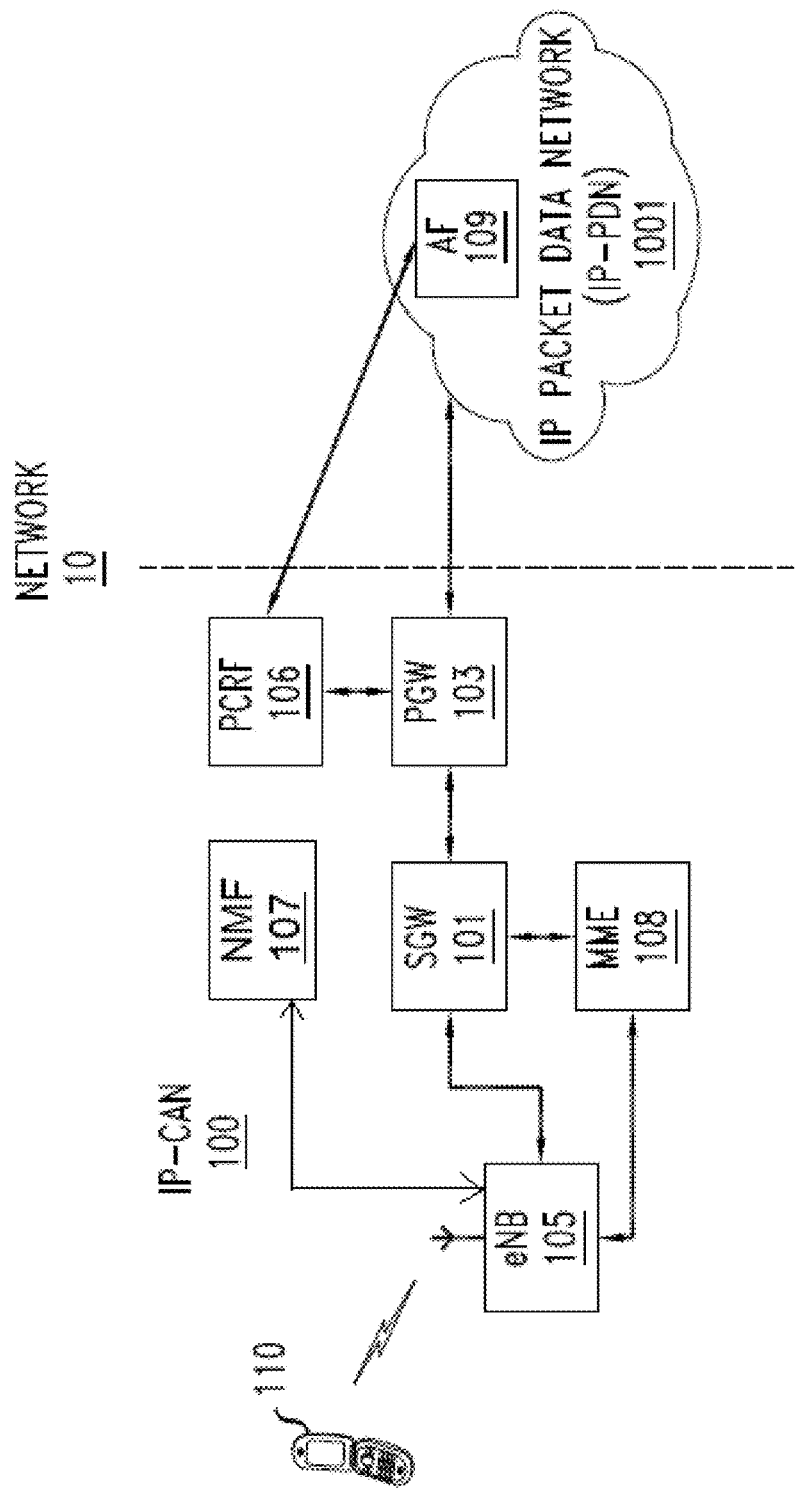

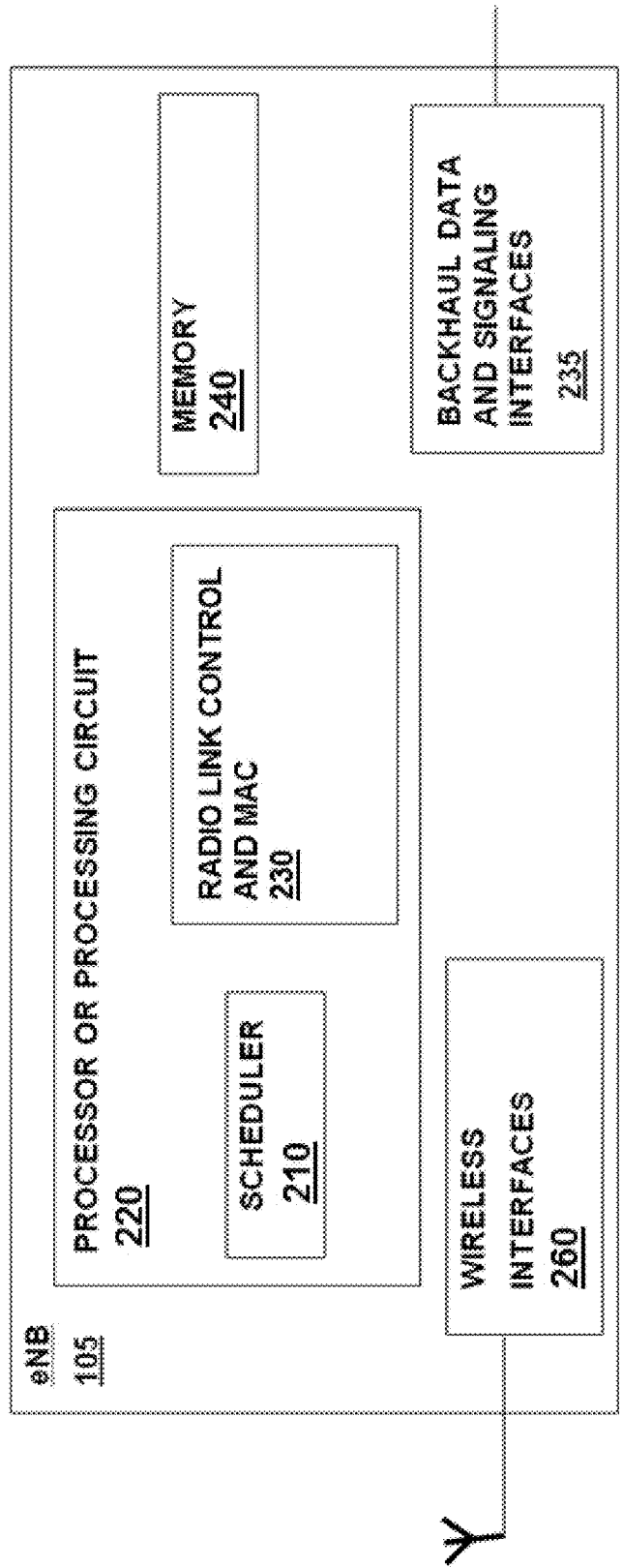
FIG. 2
(CONVENTIONAL)

| MCS | Bits per PRB linear approximation slope | Maximal approximation error fraction with at least 7 PRBs allocated | Number of allocated PRBs yielding maximal approximation error |
|---|---|---|---|
| 7 | 122.654 | 0.026 | 14 |
| 8 | 140.046 | 0.023 | 32 |
| 9 | 157.759 | 0.023 | 32 |
| 10 | 157.759 | 0.022 | 32 |
| 11 | 175.688 | 0.034 | 9 |
| 12 | 201.302 | 0.026 | 29 |
| 13 | 228.500 | 0.021 | 30 |
| 14 | 257.604 | 0.018 | 8 |
| 15 | 286.154 | 0.021 | 17 |
| 16 | 306.623 | 0.019 | 47 |
| 17 | 306.623 | 0.019 | 47 |
| 18 | 325.258 | 0.023 | 18 |
| 19 | 361.194 | 0.022 | 19 |
| 20 | 395.393 | 0.020 | 16 |
| 21 | 430.720 | 0.018 | 47 |
| 22 | 464.894 | 0.019 | 31 |
| 23 | 503.317 | 0.017 | 32 |
| 24 | 539.626 | 0.019 | 18 |
| 25 | 573.268 | 0.018 | 34 |
| 26 | 609.626 | 0.019 | 49 |
| 27 | 635.538 | 0.024 | 10 |
| 28 | 739.026 | 0.018 | 18 |

FIG. 4

| Per MCS distribution of PRBs during 1 sec time interval | MCS | "Useful" PRBs | Retransmission PRBs | Transmitted bits |
| --- | --- | --- | --- | --- |
| | 10 | 18 | 0 | 2856 |
| | 11 | 96 | 0 | 16904 |
| | 12 | 212 | 0 | 42584 |
| | 13 | 201 | 32 | 45784 |
| | 14 | 339 | 0 | 87248 |
| | 15 | 82 | 44 | 23472 |
| | 16 | 395 | 20 | 119392 |
| | 17 | 45 | 21 | 13680 |
| | 18 | 574 | 102 | 186920 |
| | 19 | 90 | 0 | 32744 |
| | 20 | 45 | 0 | 17688 |
| | 21 | 294 | 45 | 126392 |
| Average over 1 sec | 16.7 | 2391 | 264 | 715664 |

FIG. 5

SYSTEM AND METHOD FOR CONTROLLING AN OPERATION OF AN APPLICATION

BACKGROUND OF THE INVENTION

Field of the Invention

Example embodiments relate generally to a system and method for throughput prediction that includes computing a wireless coverage map in order to provide a mechanism for mobile applications to adapt to wireless conditions, and likewise to provide a mechanism for mobile operators to optimize and balance wireless network resources, in order to control an operation of mobile services to improve a user's quality of experience.

Related Art

FIG. 1 illustrates a conventional $3^{rd}$ Generation Partnership Project Long-Term Evolution (3GPP LTE) network 10. The network 10 includes an Internet Protocol (IP) Connectivity Access Network (IP-CAN) 100 and an IP Packet Data Network (IP-PDN) 1001. The IP-CAN 100 generally includes: a serving gateway (SGW) 101; a packet data network (PDN) gateway (PGW) 103; a policy and charging rules function (PCRF) 106; a network management function (NMF) 107; a mobility management entity (MME) 108 and E-UTRAN Node B (eNB) 105 (i.e., base station, for the purposes herein the terms base station and eNB are used interchangeably). Although not shown, the IP-PDN 1001 portion of the EPS may include application or proxy servers, media servers, email servers, etc.

Within the IP-CAN 100, the eNB 105 is part of what is referred to as an Evolved Universal Mobile Telecommunications System (UMTS) Terrestrial Radio Access Network (EUTRAN), and the portion of the IP-CAN 100 including the SGW 101, the PGW 103, the PCRF 106, the NMF 107 and the MME 108 is referred to as an Evolved Packet Core (EPC). Although only a single eNB 105 is shown in FIG. 1, it should be understood that the EUTRAN may include any number of eNBs. Similarly, although only a single SGW, PGW and MME are shown in FIG. 1, it should be understood that the EPC may include any number of these core network elements.

The eNB 105 provides wireless resources and radio coverage for one or more user equipments (UEs) 110. That is to say, any number of UEs 110 may be connected (or attached) to the eNB 105. The eNB 105 is operatively coupled to the SGW 101, the NMF 107, and the MME 108.

The SGW 101 routes and forwards user data packets, while also acting as the mobility anchor for the user plane during inter-eNB handovers of UEs. The SGW 101 also acts as the anchor for mobility between $3^{rd}$ Generation Partnership Project Long-Term Evolution (3GPP LTE) and other 3GPP technologies. For idle UEs 110, the SGW 101 terminates the downlink data path and triggers paging when downlink data arrives for UEs 110.

The PGW 103 provides connectivity between UE 110 and the external packet data networks (e.g., the IP-PDN) by being the point of entry/exit of traffic for the UE 110. As is known, a given UE 110 may have simultaneous connectivity with more than one PGW 103 for accessing multiple PDNs.

The PGW 103 also performs policy enforcement, packet filtering for UEs 110, charging support, lawful interception and packet screening, each of which are well-known functions. The PGW 103 also acts as the anchor for mobility upon SGW relocation during handovers within LTE network, as well as between 3GPP and non-3GPP technologies, such as Worldwide Interoperability for Microwave Access (WiMAX) and $3^{rd}$ Generation Partnership Project 2 (3GPP2 (code division multiple access (CDMA) 1× and Enhanced Voice Data Optimized (EvDO)).

Still referring to FIG. 1, eNB 105 is also operatively coupled to the MME 108. The MME 108 is the control-node for the EUTRAN, and is responsible for idle mode UE 110 paging and tagging procedures including retransmissions. The MME 108 is also responsible for choosing a particular SGW for a UE during initial attachment of the UE to the network, and during intra-LTE handover involving Core Network (CN) node relocation. The MME 108 authenticates UEs 110 by interacting with a Home Subscriber Server (HSS), which is not shown in FIG. 1.

Non Access Stratum (NAS) signaling terminates at the MME 108, and is responsible for generation and allocation of temporary identities for UEs 110. The MME 108 also checks the authorization of a UE 110 to camp on a service provider's Public Land Mobile Network (PLMN), and enforces UE 110 roaming restrictions. The MME 108 is the termination point in the network for ciphering/integrity protection for NAS signaling, and handles security key management.

The MME 108 also provides control plane functionality for mobility between LTE and 2G/3G access networks with an S3 type of interface from the SGSN (not shown) terminating at the MME 108.

The Policy and Charging Rules Function (PCRF) 106 is the entity that makes policy decisions and sets charging rules. It has access to subscriber databases and plays a role in the 3GPP architecture as specified in 3GPP TS 23.203 "Policy and Charging Control Architecture." The network management function (NMF) 107 is the entity that controls operations of the Radio Access Network.

The IP-PDN 1001 network may include an application function (AF) 109. The Application Function (AF) 109 is an entity that is application aware and is an ultimate receiver of exported eNB data that may be used to more effectively deliver content to the UE 110 to improve and/or optimize the network 10. AF 109 may alternatively or additionally be positioned inside the UE 110.

FIG. 2 illustrates a conventional E-UTRAN Node B (eNB) 105. The eNB 105 includes: a memory 240; a processor 220; a scheduler 210; wireless communication interfaces 260; Radio Link Control (RLC) and Medium Access Control (MAC) layer control 230 for each bearer; and a backhaul interface 235. The RLC and MAC layer control 230 is responsible for RLC and MAC layer protocol signaling, as defined by the 3GPP standards. The processor or processing circuit 220 controls the function of eNB 105 (as described herein), and is operatively coupled to the memory 240 and the communication interfaces 260. While only one processor 220 is shown in FIG. 2, it should be understood that multiple processors may be included in a typical eNB 105. The functions performed by the processor may be implemented using hardware. Such hardware may include one or more Central Processing Units (CPUs), digital signal processors (DSPs), application-specific-integrated-circuits, field programmable gate arrays (FPGAs) computers or the like. The term processor, used throughout this document, may refer to any of these example implementations, though the term is not limited to these examples. With a Virtual Radio Access Network (VRAN) architecture various functions eNB components may be distributed across multiple processing circuits and multiple physical nodes within VRAN cloud.

The eNB 105 may include one or more cells or sectors serving UEs 110 within individual geometric coverage sector areas. Each cell individually may contain elements depicted in FIG. 2. Throughout this document the terms eNB, cell or sector shall be used interchangeably.

Still referring to FIG. 2, the communication interfaces 260 include various interfaces including one or more transmitters/receivers connected to one or more antennas to wirelessly transmit/receive control and data signals to/from UEs 110, or via a control plane. Backhaul interface 235 is the portion of eNB 105 that interfaces with SGW 101, MME 108, other eNBs, or interface to other EPC network elements and/or RAN elements within IP-CAN 100. The scheduler 210 schedules control and data communications that are to be transmitted and received by the eNB 105 to and from UEs 110. The memory 240 may buffer and store data that is being processed at eNB 105, transmitted and received to and from eNB 105.

Every Transmission Time Interval (TTI), typically equal to 1 millisecond, the scheduler 210 may allocate a certain number of Physical Resource Blocks (PRBs) to different bearers carrying data over the wireless link in the downlink direction (i.e., transmitting buffered data from eNB 105 to UE 110) and uplink direction (i.e., receiving data at eNB 105 from UE 110, which is received over backhaul 235). A "bearer" may be understood to be a virtual link, channel, or data flow used to exchange information for one or more applications on the UE 110. The scheduler 210 may determine Modulation and Coding Schema (MCS) that may define how many bits of information may be packed into the allocated number of PRBs. The latter is defined by the 3GPP TS36.213 tables 7.1.7.1-1 and 7.1.7.2.1-1 (the contents of which is incorporated by reference in its entirety), which presents a lookup table for a number of bits of data that may be included in PRBs sent per TTI for a given allocated number of PRBs and a MCS value. MCS is computed by the scheduler and RLC/MAC control using Channel Quality Indicator (CQI) values reported by the UE 110 that in turn may be derived from measured UE 110 wireless channel conditions in the form of Signal to Interference and Noise Ratio (SINR).

Scheduler 210 may make PRB allocation decisions based upon a Quality of Service (QoS) Class Identifier (QCI), which represents traffic priority hierarchy. There are nine QCI classes currently defined in LTE, with 1 representing highest priority and 9 representing the lowest priority. QCIs 1 to 4 are reserved for Guaranteed Bitrate (GBR) classes for which the scheduler maintains certain specific data flow QoS characteristics. QCIs 5 to 9 are reserved for various categories of Best Effort traffic.

Conventionally, a wireless coverage map may be assembled as a location-based wireless signal quality indicator, such as SINR (Signal to Interference and Noise Ratio), which may be used to calculate bearer throughput. Such signal quality indicator data is typically assembled either based upon designated measurements with drive tests conducted using dedicated equipment by wireless service providers, or based upon assembled signal quality reports received from UEs. However, such conventional coverage maps do not provide adequate data for computing expected application bearer throughput with the necessary certainty and accuracy to be meaningfully used by mobile applications, especially in LTE and emerging 5G networks. In particular, conventional coverage maps do not provide an inexpensive means of representing signal quality indication, with necessary error margins of 10% or less (i.e., an error of 100 Kbps or less on a 1 Mbit/sec throughput) that may support mobile applications in recently advancing networks.

Additionally, while conventional coverage maps based upon designated measurements with drive tests conducted using dedicated testing equipment by wireless service providers may be relatively accurate, these coverage maps can be prohibitively expensive to produce. Therefore, these drive tests are not realistic for all possible UE locations with all permutations of neighboring cell loads (which affect interference) and weather conditions (e.g. rain or dust in the air affect noise levels). And, conventional coverage maps based upon assembled signal quality reports compiled from UEs are less accurate, as the compiled data from UEs is typically sourced from an application level (or alternatively a MAC level), the data from the reports is relatively sparse, and the data is generally not sufficiently accurate because interference variations due to permutations of neighboring cell load is not accounted for in the UE reports.

Finally, none of the conventional schemes for producing coverage maps provide direct and sufficiently accurate indication of a number of bits per wireless physical resource block (PRB) as a channel conditions characteristic. For example, in LTE a Modulation and Coding Schema (MCS) may be derived from Channel Quality Indicator (CQI) reports from UEs. However, even for stationary UEs, observed MCS variations during 1 sec time intervals (as computed at eNodeB RLC and scheduler layers) may be large enough to experience a more than 200% variation in estimated throughput, due in part to fluctuations in channel conditions.

SUMMARY OF INVENTION

At least one example embodiment relates to a method of controlling an operation of an application.

In one example embodiment, the method includes obtaining, by one or more processors of at least a first network node, network identification information and cell load information for a first bearer during a first time period; computing, by the one or more processors, an actual transport block size per physical resource block (ATpP) slope for the first bearer during the first time period, based on the cell load information; and exporting, by the one or more processors, the network identification information and the ATpP slope to a node processor of a second network node to control an operation of an application using the first bearer.

In one example embodiments the cell load information includes at least a number of useful physical resource blocks and an approximate number of transmitted bits that have been allocated for the first bearer during the first time period.

In one example embodiment, the network identification information includes globally recognized bearer identification information and cell/sector identification information associated with the first bearer.

In one example embodiment, the method further includes receiving a trigger, the trigger causing the one or more processors to obtain the network identification information and the ATpP slope information for the first bearer.

In one example embodiment, the trigger is caused by an event, the event being at least one of a state of interference level (SIL) change of the first network node and detection that no coverage map exists for a geographic area that includes the first network node.

In one example embodiment, the number of useful physical resource blocks are physical resource blocks that are not used for a retransmission of data.

At least one example embodiment relates to a method of controlling an operation of an application.

In one example embodiment, the method includes receiving, by one or more processors of at least a first network node, map information data and network identification information for a plurality of bearers in a first geographic area; obtaining, by the one or more processors, user equipment (UE) location information corresponding to the plurality of bearers using the network identification information; associating, by the one or more processors, the UE location information with geographic pixel information of the first geographic area; calculating, by the one or more processors, an interference vector using the cell/sector load information; and computing, by the one or more processors, a coverage map tuple using the interference vector; and controlling, by the one or more processors, an operation of an application using the coverage map tuple.

In one example embodiment, the method further includes predicting throughput using the coverage map tuple in order to control the operation of the application.

In one example embodiment, the map information data includes an actual transport block size per physical resource block (ATpP) slope and cell/sector load information for the plurality of bearers.

In one example embodiment, the network identification information includes globally recognized identification information and cell/sector identification information associated with the plurality of bearers.

In one example embodiment, the obtaining of the UE location information includes using one of application level messaging, MAC layer messaging and a triangulation method to obtain the UE location information from a plurality of UEs associated with the plurality of bearers in the first geographic area.

In one example embodiment, the coverage map tuple includes the ATpP slope, the geographic pixel information and state of interference level (SIL) information for the first geographic area.

In one example embodiment, the method further includes compiling a wireless coverage map of the first geographic area using the coverage map tuple, wherein the predicting of the throughput is accomplished using the wireless coverage map.

At least one example embodiment relates to at least a first network node.

In one example embodiment, the at least a first network node includes one or more processors configured to, obtain network identification information and cell load information for a first bearer during a first time period, compute an actual transport block size per physical resource block (ATpP) slope for the first bearer during the first time period, based on the cell load information, and export the network identification information and the ATpP slope to a node processor of a second network node to control an operation of an application using the first bearer.

In one example embodiment, the cell load information includes at least a number of useful physical resource blocks, and an approximate number of transmitted bits, that have been allocated for the first bearer during the first time period.

In one example embodiment, the network identification information includes globally recognized bearer identification information and cell/sector identification information associated with the first bearer.

In one example embodiment, the one or more processors is further configured to, receive a trigger, the trigger causing the one or more processors to obtain the network identification information and the ATpP slope information for the first bearer.

In one example embodiment, the trigger is caused by an event, the event being at least one of a state of interference level (SIL) change of the first network node and detection that no coverage map exists for a geographic area that includes the first network node.

In one example embodiment, the number of useful physical resource blocks are physical resource blocks that are not used for a retransmission of data.

At least one example embodiment relates to at least a first network node.

In one example embodiment, the at least a first network node includes one or more processors configured to, receive map information data and network identification information for a plurality of bearers in a first geographic area, obtain user equipment (UE) location information corresponding to the plurality of bearers using the network identification information, associate the UE location information with geographic pixel information of the first geographic area, calculate an interference vector using the cell/sector load information, compute a coverage map tuple using the interference vector, and control an operation of an application using the coverage map tuple.

In one example embodiment, the one or more processors is further configured to, predict throughput using the coverage map tuple in order to control the operation of the application.

In one example embodiment, the map information data includes an actual transport block size per physical resource block (ATpP) slope and cell/sector load information for the plurality of bearers.

In one example embodiment, the network identification information includes globally recognized identification information and cell/sector identification information associated with the plurality of bearers.

In one example embodiment, the one or more processors is configured to obtain the UE location information by using one of application level messaging, MAC layer messaging and a triangulation method to obtain the UE location information from a plurality of UEs associated with the plurality of bearers in the first geographic area.

In one example embodiment, the coverage map tuple includes the ATpP slope, the geographic pixel information and state of interference level (SIL) information for the first geographic area.

In one example embodiment, the one or more processors are further configured to, compile a wireless coverage map of the first geographic area using the coverage map tuple, wherein the predicting of the throughput is accomplished using the wireless coverage map.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 1 illustrates a conventional 3rd Generation Partnership Project long-Term Evolution (3GPP LTE) network;

FIG. 2 illustrates a conventional E-UTRAN Node B (eNB);

FIG. 4 is a table of MCS values corresponding to MCS slopes of linear approximations, TBS linear approximation error, and a number of PRBs per TTI yielding a maximum error difference between an actual and an approximated TBS value, in accordance with an example embodiments;

FIG. 5 is a table of an example PRB distribution for a 1 second duration for a data bearer that belongs to a stationary UE, in accordance with an example embodiments;

DETAILED DESCRIPTION

Figure 3:
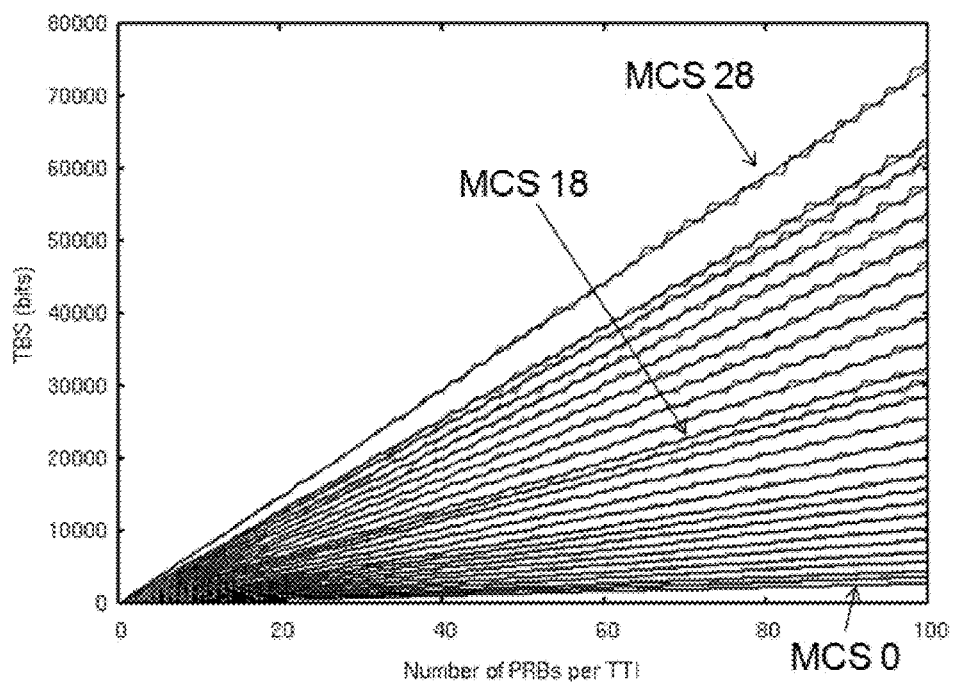
FIG. 3 is a graphical representation of transport block size (TBS) values as a function of a number of physical resource blocks (PRBs) for a spectrum of modulation and coding scheme (MCS) values, in accordance with an example embodiments.

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium, such as a non-transitory storage medium. A processor(s) may perform the necessary tasks.

Specific structural and functional details disclosed herein are merely representative for purposes of describing example embodiments. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that, manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

General Methodology:

In order to compute a wireless coverage map that may accurately and adequately predict UE throughput in a relatively inexpensive manner, the coverage map may be expressed in terms of a number of bits per wireless physical resource block (PRB). Such a coverage map may be used to predict an expected bearer throughput of mobile users based upon UE location, which may be effectively applied to current LTE networks as well as emerging 5G networks, where mobile applications (especially video) need to quickly adapt to anticipated network conditions, and virtualized network resources may be efficiently and timely reallocated to areas where anticipated throughput is inadequate for an anticipated traffic load.

For these purposes, a new wireless coverage map metric may be utilized. The new metric may be a number of Bits per PRB (BpP), as a function of a UE location (UE_L), and as a function of Permutations of Neighboring Cell Load (PNCL), as shown in the equation below.

$$BpP=f(UE\_L, PNCL) \quad \text{Equation 1}$$

Dependency of weather conditions may also be added as additional embodiment.

In an embodiment, this new wireless coverage map metric may be computed and averaged by the wireless RAN, and associated with a corresponding UE location to form a coverage map. This means of creating a coverage map may be performed by the wireless RAN, without the need for expensive drive tests or dedicated additional equipment, in order to allow for collecting comprehensive and accurate information for all locations and interference states.

Description of the Wireless Coverage Map Metric:

3GPP standard TS36.213 includes table 7.1.7.2.1-1 that defines, for each pairing of a MCS value and a number of physical resource blocks (denoted as <MCS, numer_of_prbs>), a corresponding Transport Block Size (TBS) value. The TBS value represents a number of bits that may be assigned to a block of PRBs. The functional relationship between TBS values and the pairing of MCS and PRBs (which may be denoted as TBS=f(MCS, PRB)), as defined by table 7.1.7.2.1-1, is a non-linear relationship with respect to the MCS value, though this relationship is nearly linear with respect to the number of PRBs. This relationship is shown in FIG. 3, which graphically represents TBS values as a function of PRBs (denoted as TBS=$f_{MCS}$(PRB)) for a spectrum of MCS values, together with linear approximations computed using a least squares method for a 20 Mhz system bandwidth (with maximum 100 PRBs per TTI).

FIG. 4 depicts a table with MCS values (shown in the first column), corresponding to the MCS slopes of linear approximations (shown in second column), TBS linear approximation error (shown as a fraction, in the third column), and a number of PRBs per TTI yielding a maximum error difference between an actual and an approximated TBS value (shown in the fourth column). The linear approximation error is shown for a case where at least 7 PRBs per TTI are allocated by the scheduler. The MCS slopes are computed using linear approximation with least squares method of the 3GPP TS36.213 Table 7.1:7.2.1-1, and the maximum error difference is computed as a difference between linear approximation of the TBS value and the value provided by 3GPP TS36.213 Table 7.1.7.2.1-1.

As depicted in FIG. 4, the linear approximation error (the third column) does not exceed 2.6%. The linear approximation slopes (the second column) of FIG. 4 represents an average number of TBS bits per PRB, which may be denoted as a "TTpP slope." For a time interval of 1 sec during a period when a MCS value is constant (k), the scheduler may allocate n PRBs for a given data bearer, such that an approximated bearer throughput may be represented by $\alpha_k*n$, where $\alpha_k$ is the TTpP slope (corresponding to a MCS value of k, shown in FIG. 4). The value $\alpha_k$ may be a non-decreasing function of k. Generally higher MCS value k corresponds to a larger $\alpha_k$. An exception to this rule exists for the MCS values 9 and 10 (which are on the boundary between QPSK (Quadrature Phase-Shift Keying) and 16 QAM (16 Quadrature Amplitude Modulation)) and MCS values 16 and 17 (which are on the boundary of 16QAM and 64QAM (64 Quadrature Amplitude Modulation)), and as such the following rules apply: $\alpha_9=\alpha_{10}$, and $\alpha_{16}=\alpha_{17}$.

During the 1 sec time interval, if channel conditions are assumed to be less than excellent, the MCS values (as assigned by an eNodeB scheduler for a given bearer) may vary even when the corresponding UE is stationary. For this reason, use of a PRB distribution per MCS (as dynamically assigned by the scheduler) provides more stable information. An example of such a PRB distribution, from an experiment during 1 sec time interval for a data bearer that belongs to a stationary UE, is represented in the table of FIG. 5.

For a specific bearer and a given 1 sec time interval shown in FIG. 5, n may be denoted as a total number of "useful" PRBs allocated by a scheduler for a bearer (shown in the third column), where "useful" PRBs are considered to be PRBs that are not retransmissions. The number of "useful" PRBs allocated with MCS k for the bearer may therefore be denoted as $n_k$. The approximated number of bits sent during the given second for this bearer may be represented as $\Sigma_k \alpha_k n_k$. Therefore, the metric Actual TBS per PRB (ATpP) slope for the given data bearer during a 1 second time interval may be represented as follows:

$$\bar{\alpha} = \Sigma_k \alpha_k \frac{n_k}{n} = \frac{\Sigma_k \alpha_k n_k}{n} \qquad \text{Equation 2}$$

The ATpP slope $\bar{\alpha}$ is the metric that may be represented in a wireless coverage map. This metric represents a number of bits of information per PRB that may be transmitted to a UE situated in a given location. By using this metric, an approximation of TBS per second (representing bearer throughput) for the given location and can be made which is dependent only on the total number of PBRs per second that may be allocated for a given bearer, and this approximation is independent of an actual distribution of the number of PRBs across transmission time intervals within this second. It is noted that the ATpP slope indirectly includes a number of retransmission PRBs (which is included in the represented denominator term n), where more retransmissions correspond to worse channel conditions. Higher values of the ATpP slope may correspond to higher MCS values used by the scheduler and/or less retransmissions, therefore correspond to better channel conditions, while lower values of the ATpP slope may correspond to worse channel conditions.

Figure 6:
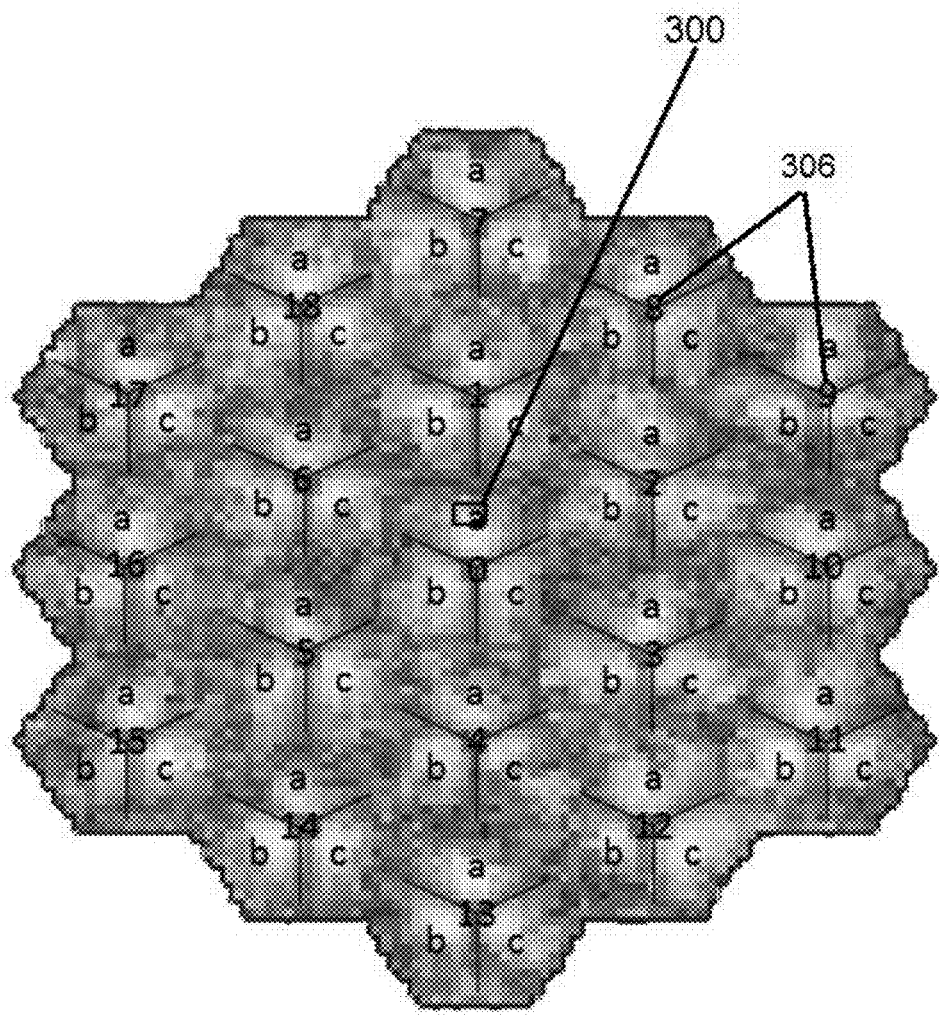
FIG. 6 graphically illustrates local channel conditions for a 19 cell layout, in accordance with an example embodiments.

It should be understood that the ATpP slope depends upon interference from neighboring cells, which may be quantified using the measure of a load of neighboring cells. FIG. 6 graphically illustrates an example of a 19 cell layout (where each cell 306 is numerically labelled from 1 to 19). Cell 0 is located in the center. The 7 cells in the first tier that surround cell 0 include cells 1-7. These first tier cells are surrounded by a second tier of 12 cells that include cells 7-18. The shading of FIG. 6 represent the local channel conditions, where lighter shading represents better channel conditions and darker shading represents worse channel conditions. Better channel conditions correspond to higher ratio of wireless signal power to interference and noise (higher interference results in worse channel conditions). FIG. 6 represents a wireless coverage map. The map is produced by assigning shading to ATpP values (lighter shades correspond to higher values and darker shades correspond to lower values), and then painting each point on the geographic map with the shading corresponding to the ATpP value computed for that geographic location.

Basic Concept for Computing a Wireless Coverage Map:

In order to compute a coverage map, a discretization may be performed, as follows:

A. Geolocation Discretization:

A geographic map may be overlayed with a grid of pixels (e.g. of size 5×5 meters, or 10×10 meters, or 50×50 meters—depending upon a required precision and granularity of the coverage map). Each pixel may be assigned a uniform ATpP slope metric value for a given interference state level.

B. State of Interference Level (SIL) Discretization:

SIL of a given cell/sector may be described in terms of a vector of load levels of neighboring cells/sectors. The load level of a cell/sector may be quantified using a measured average aggregate PRB utilization per second. This may be represented as a percentage of maximal number of PRBs per second, where for a 20 Mhz cell bandwidth for instance, a maximal number may be 100,000 PRBs/sec (100 PRBs per TTI). Similarly, for a 10 Mhz cell bandwidth, a maximal number may be 50,000 PRBs per sec. Examples of load levels for an individual cell-sector may include the following.

Example 1 (an Example of a Rough Granularity)

Load levels may be, for instance "fully loaded" (at 70% load, and up), "half-loaded" (at 40%-70% load), "quarter-loaded" (at 15%-40% load), and "not loaded" (at 15% load, or less).

Example 2 (an Example of a Finer Granularity)

Load levels may be, for instance a "first level" (at 95% load, and up), a "second load level" (at 85-95% load), a "third load level" (at 75-85% load) . . . a "ninth load level" (at 15-25% load), a "tenth load level" (at 5-15% load), and an "eleventh load level" (at below 5% load).

Figure 7A:
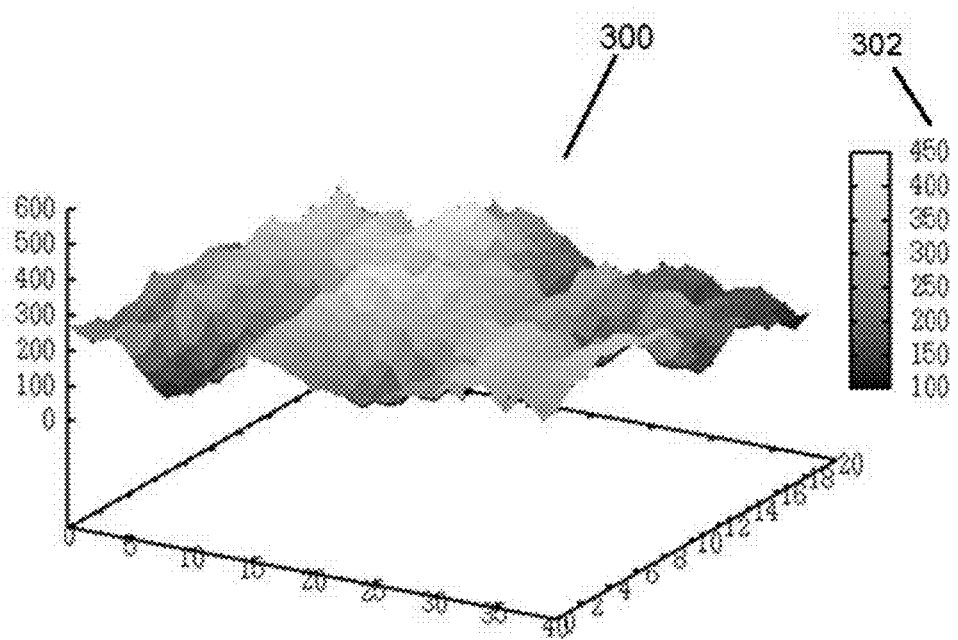
FIG. 7A graphically represents a coverage map corresponding to a state of interference level (SIL) from neighboring cells for a geographic area of FIG. 6, where ATpP values indicate a 100% load, in accordance with an example embodiments.
Figure 7B:
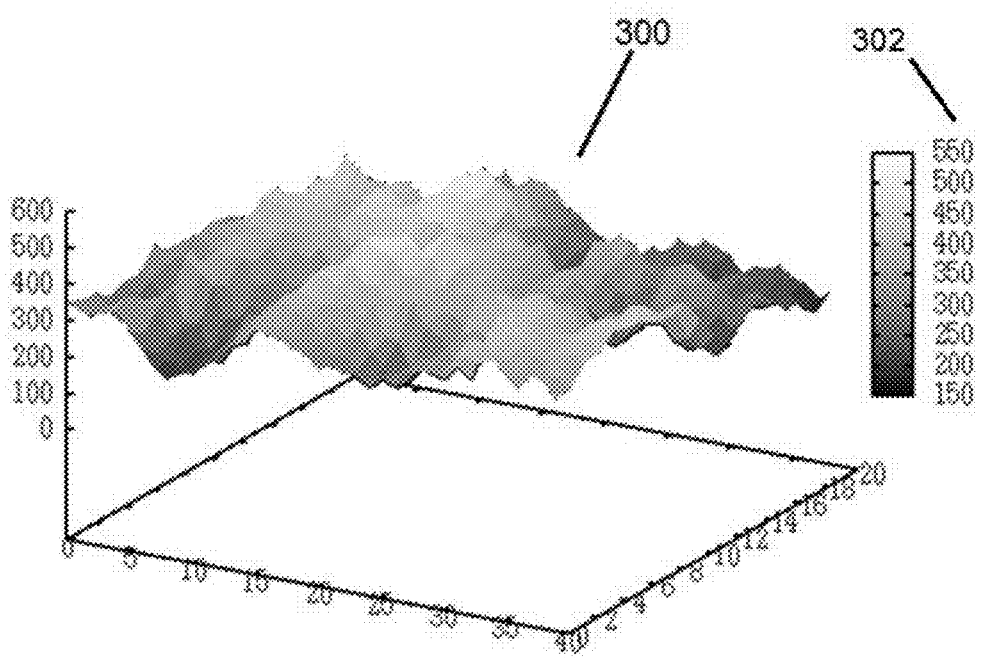
FIG. 7B graphically represents a coverage map corresponding to a state of interference level (SIL) from neighboring cells for a geographic area of FIG. 6, where ATpP values indicate a 75% load, in accordance with an example embodiments.
Figure 7C:
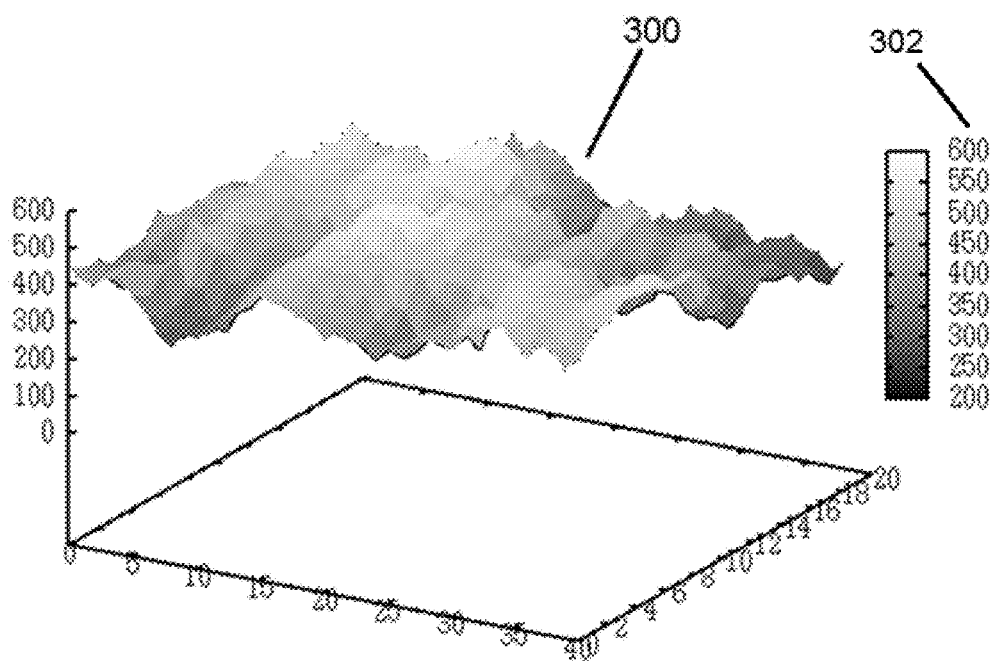
FIG. 7C graphically represents a coverage map corresponding to a state of interference level (SIL) from neighboring cells for a geographic area of FIG. 6, where ATpP values indicate a 25% load, in accordance with an example embodiments.
Figure 7D:
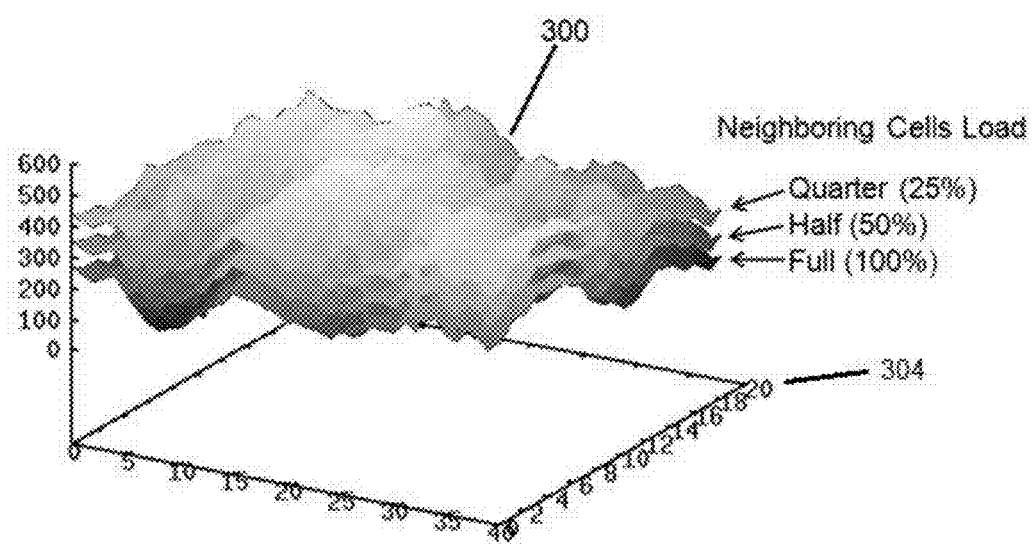
FIG. 7D graphically represents the coverage maps of FIGS. 7A-7D compiled into a single graph, in accordance with an example embodiments.

FIGS. 7A-7C graphically represent coverage maps corresponding to different SILs from neighboring cells for a geographic area of interest 300 shown in FIG. 6. In particular, for the same geographic area of interest 300, FIG. 7A graphically depicts ATpP values for a scenario where neighbor cells/sectors have a 100% load. Meanwhile, FIG. 7B graphically depicts ATpP values for a scenario where neighbor cells/sectors have a 75% load, and FIG. 7C graphically depicts ATpP values for a scenario where neighbor cells/sectors have a 25% load. The maps of FIGS. 7A-7C share a same shading scheme as FIG. 6, such that lighter shading corresponds to better channel conditions, and darker shading corresponds to worse channel conditions (and these channel conditions may be numerically represented by ATpP values). FIG. 7D shows the three coverage maps from FIGS. 7A-7C compiled into a single graph, in order to provide a convenient means of comparison. Specifically, the graph in FIG. 7D shows, for a same set of location pixels 304 (corresponding to area 300), a scenario where lower ATpP values are displayed at a point when neighbor cells/sectors have a 100% load (where these ATpP values are from FIG. 7A), a scenario where medium ATpP values are displayed when neighbor cells/sectors have a 50% load (where these ATpP values are from FIG. 7B), and a scenario where higher ATpP values are displayed at a point when neighbor cells/sectors have a 25% load (where these values are from FIG. 7C). Therefore, for the geographic area of interest 300 (located in cell/sector 0/*a* of FIG. 6), the interference state may be represented as a vector of loads <L0/*b*, L0/*c*, L1/*b*, L1/*c*, L2/b, L3/a, L5/a, L6/c, L8/b, L18/c>. If the cell/sectors providing interference to a lesser degree are also to be included, then the following additional vector loads could also be included for these vector loads: L4/a, L7/b, L7/c, L9/b, L10/b, L11/a, L12/a, L13/a, L14/a, L15/a, L16/c, L17/c.

A computed coverage map is a set of tuples <average ATpP Slope, pixel, SIL>, where the average ATpP Slope is computed for bearers for which UE is located within the given pixel, with the given SIL value. Therefore, FIGS. 7A-7C represent an example of a shading coded coverage map areas for different SILs of neighboring cells/sectors, where FIG. 7A may for instance be considered an example of a neighboring cells/sectors "fully loaded", FIG. 7B may be considered and example of neighboring cells/sectors "half-loaded," and FIG. 7C may be "quarter-loaded."

Figure 8:
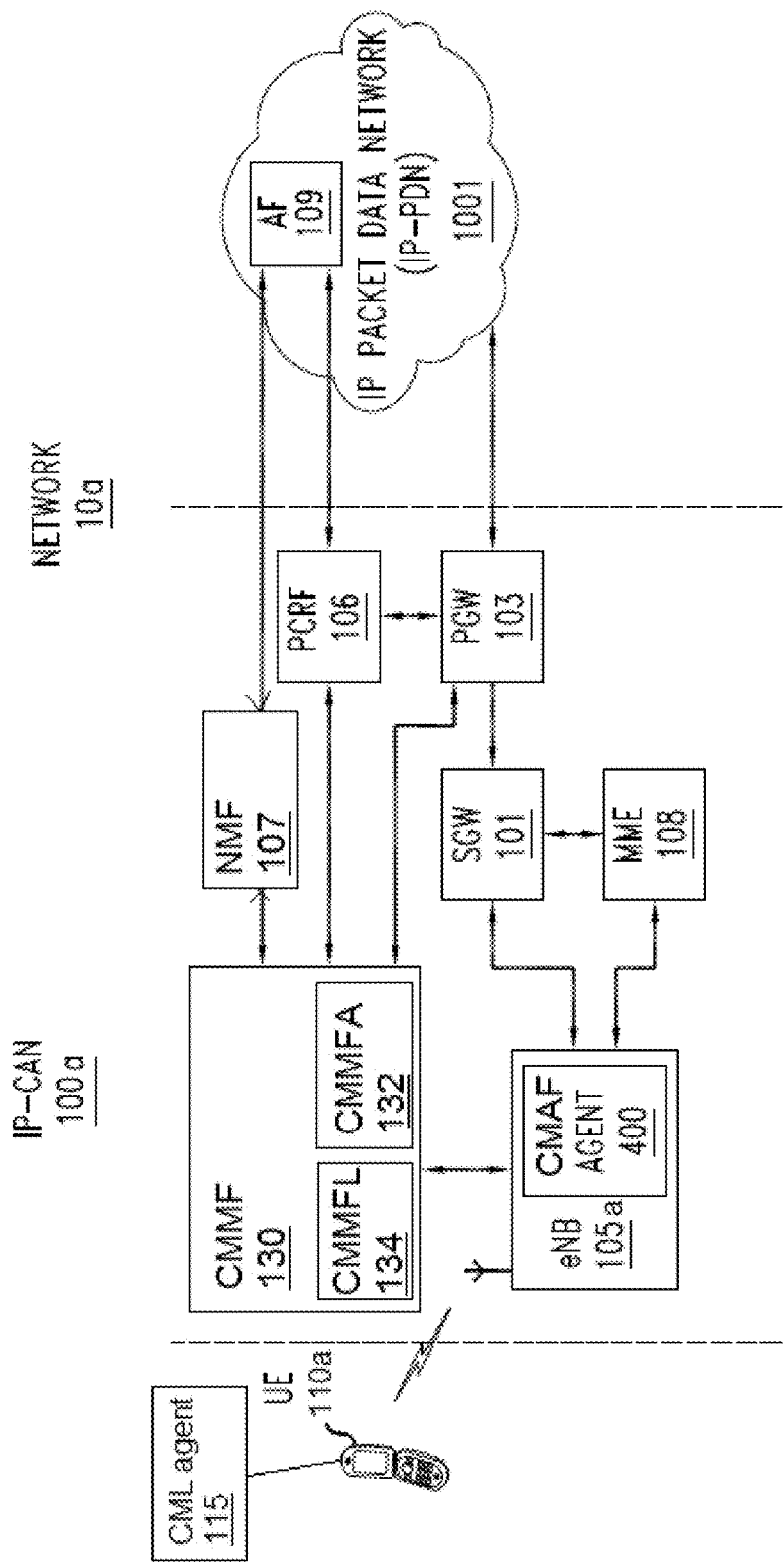
FIG. 8 illustrates a reconfigured 3GPP LTE network, in accordance with an example embodiment.
Figure 9:
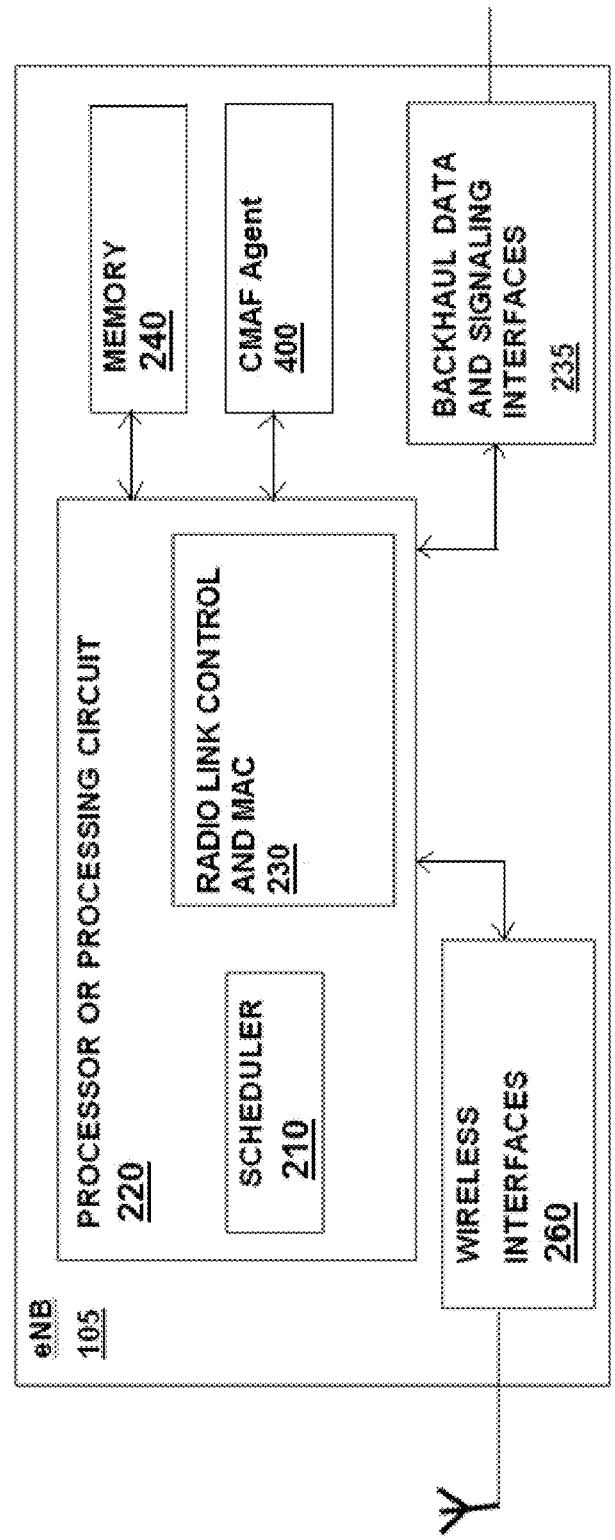
FIG. 9 illustrates a reconfigured E-UTRAN Node B (eNB), in accordance with an example embodiment.
Figure 10:
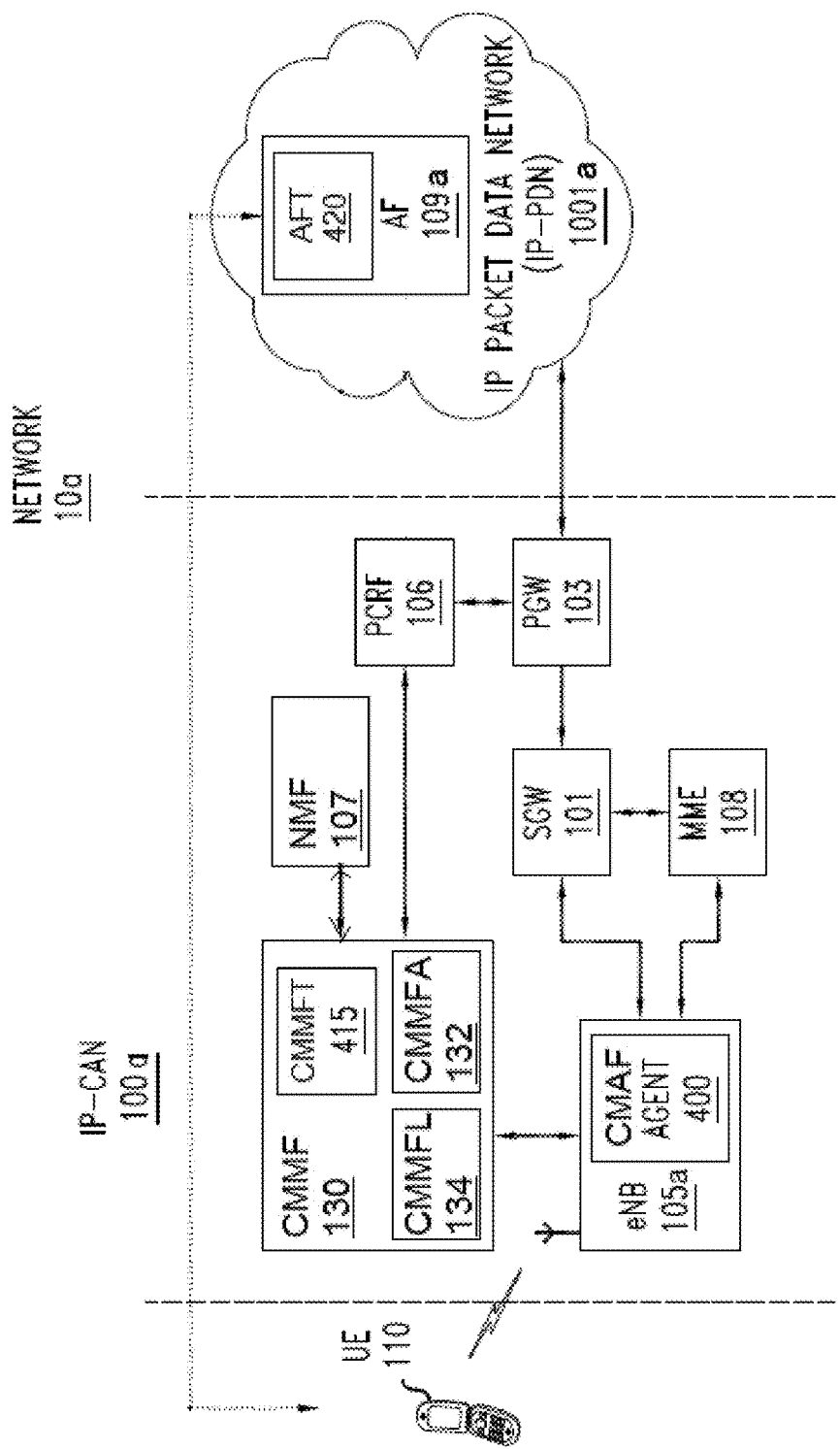
FIG. 10 illustrates another reconfigured 3GPP LTE network, in accordance with an example embodiment.
Figure 11:
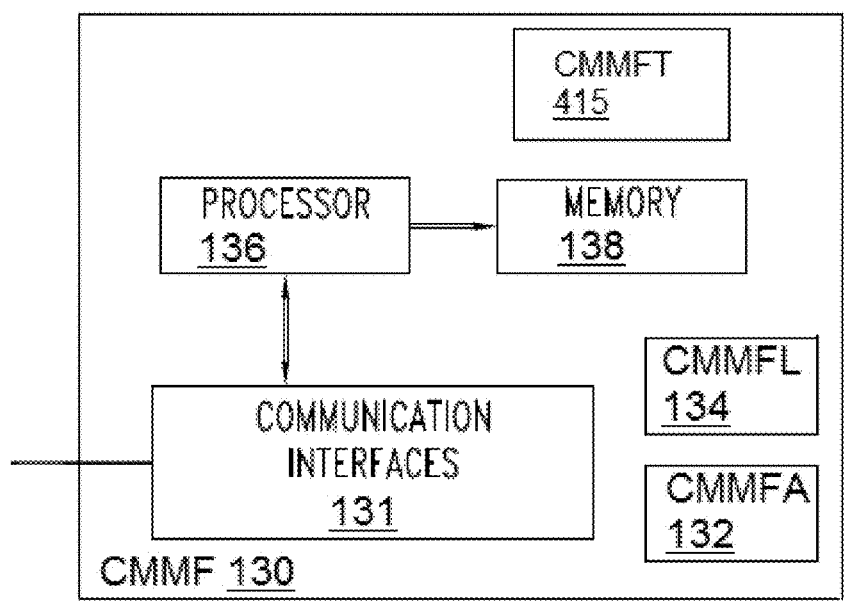
FIG. 11 illustrates a Coverage Map Manager Function (CMMF), in accordance with an example embodiment.

Specific Methodology for Computing a Wireless Coverage Map:

The following description collectively references FIGS. 8-13. FIG. 8 illustrates a modified network 10a, where IP-CAN 100a may include a modified eNB 105a with a Coverage Map Agent Function (CMAF) agent 400 residing in the eNB 105a. FIG. 9 illustrates the modified eNB 105a in more detail, showing the CMAF agent 400 interfacing with and being controlled by the eNB processor 220. IP-CAN 100a (FIG. 8) may also include a Coverage Map Manager Function (CMMF) 130 capable of communicating with the CMAF agent 400. As shown in FIG. 11, the CMMF 130 may be a network node that is separate from eNB 105a. The CMMF 130 may therefore be controlled by a dedicated processor 136, where the processor 136 may control the functions of the CMMF 130. The CMMF 130 may include a communication interface 131 capable of sending and receiving data, and a memory 138 capable of saving and/or buffering both the received and the transmitted data. The CMMF 130 may further include a Coverage Map Manager Function Analyzer (CMMFA) 132 and a Coverage Map Manager Function Locator (CMMFL) 134. Referring again to FIG. 8, the IP-CAN 100a may also include a modified UE 110a that may optionally include a Coverage Map Location (CML) agent 115. The function of each of these elements may be understood in relation to the example method steps described in the method of FIG. 13.

Figure 12:
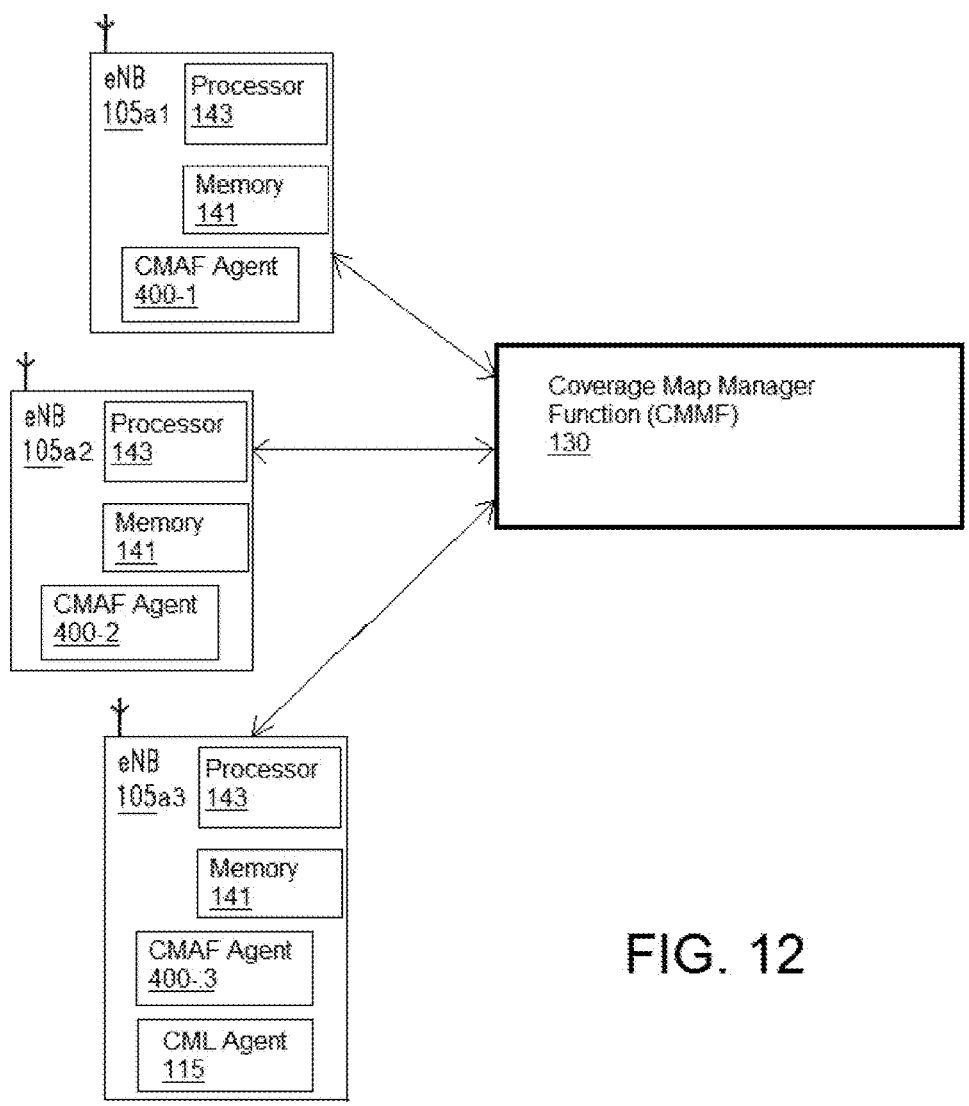
FIG. 12 illustrates a system configuration with multiple reconfigured eNBs communicating with a Coverage Map Manager Function (CMMF), in accordance with an example embodiment.
Figure 13:
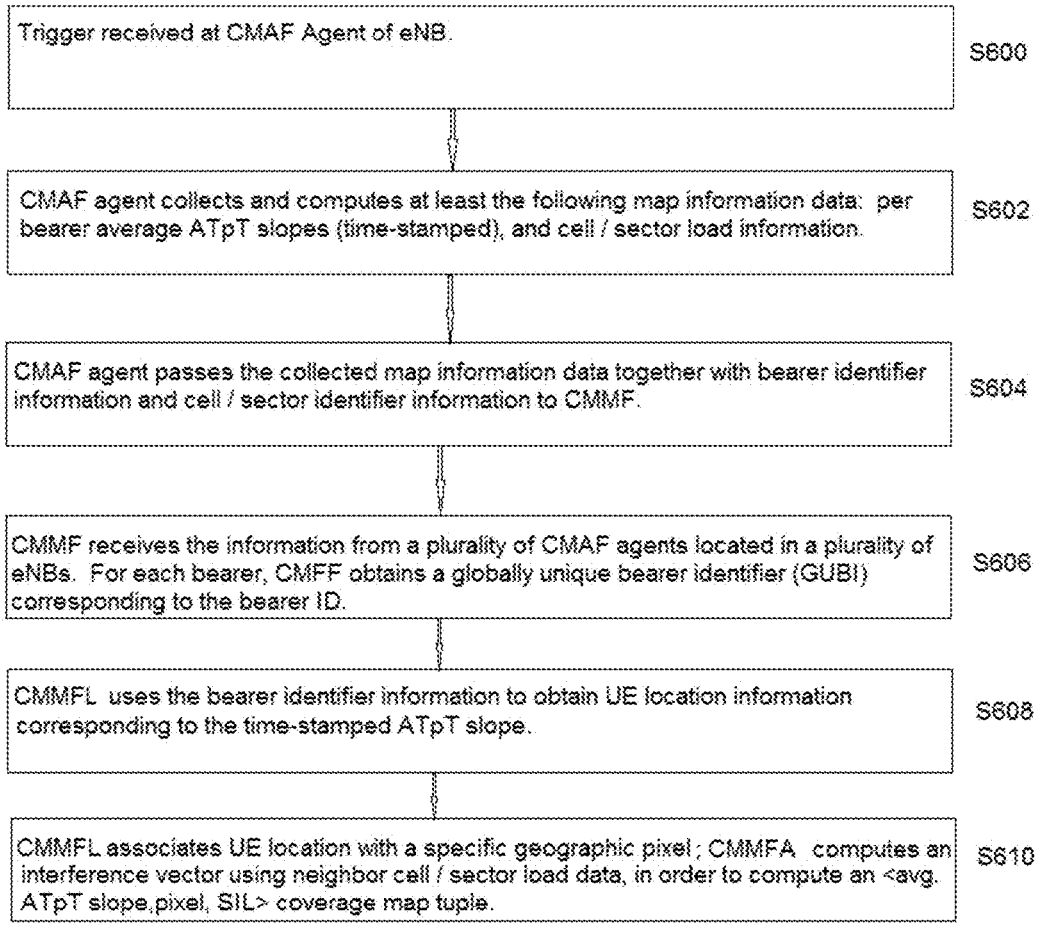
FIG. 13 is a method of controlling an operation of an application by computing an actual transport block size per physical resource block (ATpT) slope and determining a coverage map tuple, in accordance with an example embodiment.

Referencing FIG. 13, in step S600, the processor 220 may cause the CMAF agent 400 of eNB 105a to recognize a "trigger" that is received at eNB 105a. The trigger indicates to CMAF agent 400 that a procedure for collecting tuples <average ATpP Slope, pixel, SIL> may commence. The trigger may be a demand, which may be initiated as a request message from the Coverage Map Manager Function 130 (shown in FIGS. 8 and 12). The trigger may be received periodically, or at discrete time periods caused by an event. Example of such an event could be a SIL change, so that CMMF detects that there is no Coverage Map for a given geographic area with the current SIL from neighboring cells. Alternatively, the CMAF agent 400 may unilaterally initiate the method of FIG. 13, such that the trigger is an internal trigger that is initiated within the eNB 105a. Furthermore, the trigger may focus on select geographic locations (especially in a system with multiple eNBs 105a1, 105a2 and 105a3, as shown in FIG. 12, and described in more detail below), such that an eNB 105a of interest may only receive a trigger if the eNB 105a is in the geographic location of interest. The geographic area of interest may, for instance, be a geographic area that needs or requires an updated wireless coverage map.

In step S602 of FIG. 13, the processor 220 may cause the CMAF agent 400 to collect and compute map information data. The map information data may include time-stamped per bearer average ATpP slopes that may be obtained from the scheduler 210 of eNB 105a, as described above. The map information data may also include cell/sector load information, which may include a number of "useful" physical resource blocks and an approximate number of transmitted bits that have been allocated for a bearer (where this information also may be obtained from the scheduler 210 of eNB 105a), as described in more detail above.

In step S604, the processor 220 may cause the CMAF agent 400 to pass the collected map information data together with network identification information to the CMMF 130. The network identification information may include bearer identifiers for the bearers of interest. These bearer identifiers may be globally unique bearer identifiers (GUBI), such as an internet protocol (IP) address identifier or an international mobile subscriber identity (IMSI) identifier. These GUBI identifiers may be obtained via one of the methods described in 3GPP standard TR23.705, or via a method described in the patent application "SYSTEM AND METHOD FOR EXPORTING REAL-TIME USER EQUIPMENT AND BEARER STATE INFORMATION" (application Ser. No. 14/534,491, filed on Nov. 6, 2014), or alternatively via another comparable method that allows for the identification of GUBI identifiers. The network identification information may also include cell/sector identifiers that may also be globally-recognizable identifiers that may be obtained from MME 108. This information may be passed to CMMFA 132.

In step S606, the processor 136 may cause CMMF 130 to recognize the map information data and the network identification information received from multiple CMAF agents 400-1/400-2/400-3 that may reside in a respective eNB 105a1/105a2/105a3 (see the system of FIG. 12). The CMMF 130 may pass this information to CMMFL 134.

In step S608, the processor 136 may cause the CMMFL 134 (see FIG. 10) to use the bearer identifier information to obtain UE physical location information that may correspond to the time-stamped ATpP slope information. This UE physical location information may be reported by the UE 110a using application level messages, or using MAC layer messages. The UE may use a built-in GPS device to obtain its own location information. In one embodiment this reporting by the UE may be triggered by the eNB 105a together with the trigger for the coverage map collection. In another embodiment this reporting by the UE 110 may be triggered by application layer messages from CMMFL 134. Alternatively, the UE location information may be obtained by the CML agent 115 (within eNB 105a3 of FIG. 12) via any well-known triangulation method, where this UE location information may be passed to CMAF Agent 400-3 (also shown in FIG. 12) to be further reported to CMMF in step S604.

In step S610, the processor 136 may cause the CMMFL 134 to associate the UE physical location information with a specific geographic pixel. The associated information may be passed to CMMFA 132.

The processor 136 then may cause CMMFA 132 to compute an interference vector using the neighbor cell/sector load data received in step S604, and compute the <average ATpP Slope, pixel, SIL> coverage map tuple. If more than one average ATpP slope report for the same pixel and SIL are available, the processor 136 of CMMF 130 may perform additional averaging, smoothing, and other data analysis procedures, possibly utilizing historic data for that pixel and SIL. The computed wireless coverage map information (or, a portion of it) may be further sent by the CMMFA 132 to various network functions (such as a Coverage Map Manager Function Throughput (CMMFT) 415, or NMF 107, for example). CMMFT 415 may, for example, receive the wireless coverage map information for the current or anticipated UE location, combine it with the received serving cell load (in the form of average number of PRBs available to a bearer of the UE) and use this information to compute current or anticipated application throughput T as a mathematical product of ATpP value for the location and an average number of PRBs available to the UE bearer, as shown in Equation 3, below.

$$T=\text{ATpP\_value} * \text{Average\_Number\_of\_PRBs} \quad \text{Equation 3}$$

CMMFT 415 may pass the computed throughput to an Application Function Throughput (AFT) 420, where AFT 420 may in turn use the computed current or anticipated application throughput to modify application behavior to better adjust to the anticipated throughput in order to improve end user QoE. In an embodiment, a video application may select video bitrate encoding matching the anticipated throughput, as an example. It should be understood that although the CMMFT 415 is shown in FIG. 10 to be inside CMMF 130, it the CMMFT 415 may instead be positioned as a standalone server, or CMMF 130 may be located inside other network functions and nodes.

The network may use the computed wireless coverage map information to manage wireless resources to meet the needs of mobile users and services. In one embodiment the network operator may decide to add cell towers and remote radio heads to the areas where ATpP values for certain SILs are low. In another embodiment, self optimizing networks may use the computed coverage maps to control optimal loads of cells in the area. In yet another embodiment, the information about coverage map of the area where UE 110 (or 110*a*) is currently located or expected to be located in the near future can be combined with the serving cell load and current or anticipated number of PRBs per second that the UE 110 (or 110*a*) may be allocated by the scheduler to compute anticipated UE 110 (or 110*a*) data throughput over the wireless network. This throughput may be further reported to Application Function (AF) 109*a* so that the AF 109*a* may mitigate anticipated decrease or increase in throughput. In one embodiment such mitigation may include AF 109*a* reducing (or increasing) video encoding bitrate for mobile video streamed over wireless networks when there is anticipated throughput reduction (or increase respectively). In another embodiment, the application level flow control (like the one implemented via congestion window of Transmission Control Protocol (TCP)) may make adjustments in accordance with the expected reduction or increase in network throughput.

It should be understood that, with a Virtual Radio Access Network (VRAN) architecture, the various CMMF functions and components (described herein) may instead be distributed across multiple processing circuits and multiple physical nodes within a VRAN cloud type of architecture.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method of controlling an operation of an application, comprising:
   receiving, by one or more processors of at least a first network node, map information data and network identification information for a plurality of bearers in a first geographic area;
   obtaining, by the one or more processors, user equipment (UE) location information corresponding to the plurality of bearers using the network identification information;
   associating, by the one or more processors, the UE location information with geographic pixel information of the first geographic area;
   calculating, by the one or more processors, an interference vector using the cell/sector load information; and
   computing, by the one or more processors, a coverage map tuple using the interference vector; and
   controlling, by the one or more processors, the operation of the application using the coverage map tuple,
   wherein the map information data includes an actual transport block size per physical resource block (ATpP) slope and cell/sector load information for the plurality of bearers.

2. The method of claim 1, further comprising:
   predicting throughput using the coverage map tuple in order to control the operation of the application.

3. The method of claim 1, wherein the network identification information includes globally recognized identification information and cell/sector identification information associated with the plurality of bearers.

4. The method of claim 1, wherein the obtaining of the UE location information includes using one of application level messaging, MAC layer messaging and a triangulation method to obtain the UE location information from a plurality of UEs associated with the plurality of bearers in the first geographic area.

5. The method of claim 1, wherein the coverage map tuple includes the ATpP slope, the geographic pixel information and state of interference level (SIL) information for the first geographic area.

6. The method of claim 2, further comprising:
   compiling a wireless coverage map of the first geographic area using the coverage map tuple,
   wherein the predicting of the throughput is accomplished using the wireless coverage map.

7. At least a first network node, comprising:
   a memory storing computer-readable instructions; and
   one or more processors configured to execute the computer-readable instructions such that the one or more processors are configured to,
   receive map information data and network identification information for a plurality of bearers in a first geographic area,
   obtain user equipment (UE) location information corresponding to the plurality of bearers using the network identification information,
   associate the UE location information with geographic pixel information of the first geographic area,
   calculate an interference vector using the cell/sector load information,
   compute a coverage map tuple using the interference vector, and
   control an operation of an application using the coverage map tuple, wherein the map information data includes an actual transport block size per physical resource block (ATpP) slope and cell/sector load information for the plurality of bearers.

8. The at least a first network node of claim 7, wherein the one or more processors is further configured to,
predict throughput using the coverage map tuple in order to control the operation of the application.

9. The network node of claim 7, wherein the network identification information includes globally recognized identification information and cell/sector identification information associated with the plurality of bearers.

10. The network node of claim 7, wherein the one or more processors is configured to obtain the UE location information by using one of application level messaging, MAC layer messaging and a triangulation method to obtain the UE location information from a plurality of UEs associated with the plurality of bearers in the first geographic area.

11. The network node of claim 7, wherein the coverage map tuple includes the ATpP slope, the geographic pixel information and state of interference level (SIL) information for the first geographic area.

12. The network node of claim 8, wherein the one or more processors are further configured to,
compile a wireless coverage map of the first geographic area using the coverage map tuple,
wherein the predicting of the throughput is accomplished using the wireless coverage map.

* * * * *